United States Patent
Gottlieb et al.

[11] Patent Number: 6,064,510
[45] Date of Patent: May 16, 2000

[54] SPECTRO-POLARIMETRIC IMAGER

[75] Inventors: Milton Gottlieb; Louis J. Denes, both of Pittsburgh, Pa.

[73] Assignee: Carnegie Mellon University, Pittsburgh, Pa.

[21] Appl. No.: 09/019,480

[22] Filed: Feb. 5, 1998

[51] Int. Cl.[7] .................................. G02F 1/33; G02F 1/35
[52] U.S. Cl. .......................... 359/308; 359/309; 356/327
[58] Field of Search .................................... 359/290, 465, 359/327, 305, 308, 309; 356/327, 364, 365

[56] References Cited

U.S. PATENT DOCUMENTS

| | | | |
|---|---|---|---|
| 5,132,826 | 7/1992 | Johnson et al. | 359/93 |
| 5,231,521 | 7/1993 | Johnson et al. | 359/93 |
| 5,243,455 | 9/1993 | Johnson et al. | 359/93 |
| 5,263,037 | 11/1993 | Trutna, Jr. et al. | 372/20 |
| 5,264,916 | 11/1993 | Bushman | 356/364 |
| 5,357,342 | 10/1994 | Decker et al. | 356/364 |
| 5,452,089 | 9/1995 | Bushman | 356/364 |
| 5,452,314 | 9/1995 | Aronson | 372/20 |
| 5,477,321 | 12/1995 | Johnson | 356/319 |
| 5,528,368 | 6/1996 | Lewis et al. | 356/346 |
| 5,543,917 | 8/1996 | Bushman | 356/364 |
| 5,611,004 | 3/1997 | Chang et al. | 385/11 |

*Primary Examiner*—Scott J. Sugarman
*Assistant Examiner*—Adrianne Riviere
*Attorney, Agent, or Firm*—Kirkpatrick & Lockhart LLP

[57] ABSTRACT

An electronically agile spectro-polarimetric imager is described in which an acousto-optic tunable spectral filter (AOTF) is located in series with an electronically tunable optical phase modulation plate such that incident radiation will pass through the modulation plate and the AOTF in sequence. This system makes it possible to perform both spectral analysis, complex polarization analysis and object discrimination at video-rates of incident radiation from complex target scenes according to the spectral content and polarization state of the radiation reflected or emitted from the objects within the scene, regardless of the polarization state of the incident radiation. Embodiments for analyzing incident radiation of various wavelengths are provided.

18 Claims, 8 Drawing Sheets

SPECTRO-POLARIMETRIC IMAGER

BACKGROUND OF THE INVENTION

1. Field of the Invention

The present invention relates to a system capable of low-latency image discrimination. More particularly, the present invention relates to an apparatus and method by which both spectral analysis and complex polarization analysis can be performed at high rates and over a wide range of wavelengths regardless of polarization state of the image data.

2. Description of the Invention Background

Among the obstacles that must be overcome in the development of automated machine vision systems is the ability to collect and process spectral data at varying wavelengths and at high rates of speed and to recognize and distinguish among various objects and their background. However, in all but the most simple of scenarios, such task-oriented vision apparatus suffer from low speed, high cost, great complexity and limited object identification and recognition capabilities.

In such vision systems, shape is the most commonly used object identifier. The greatest utility in improving the capabilities of such object identification systems has been shown by systems that utilize the spectral and polarimetric signatures of objects to identify and discriminate the object from its background. Spectral imaging systems typically decompose scenes into their component colors and wavelengths and discriminate the various objects in the scene according to their spectral composition. One means of accomplishing the spectral discrimination function is by use of an acousto-optic tunable spectral filter (AOTF). An AOTF is an electronically tunable optical bandpass filter. AOTF's typically consist of a specially selected birefringent crystal equipped with a means of generating an RF acoustic drive signal through the crystal. An incident beam of radiation having a first polarization state, is directed into the crystal and an acoustic wave is propagated nearly perpendicular to the incident beam within the crystal. The incident beam is diffracted by the RF drive signal and is shifted from the first polarization state to a second polarization state over a selected passband of optical frequencies, as determined by the frequency of the acoustic wave. Thus, only the portion of the incident radiation with a wavelength within the passband (or acceptance wavelength) experiences a shift in polarization. The acceptance wavelength of the filter is electronically tunable by varying the frequency of the RF drive signal within the crystal. As such, the AOTF operates to pass (or accept) that portion of the beam having a wavelength within the band determined by the RF drive signal within the crystal and to block other portions of the beam. By electronically tuning the passband of the AOTF such that the acceptance wavelength varies across a discrete portion of the spectrum, only objects in the subject scene whose wavelengths fall within that discrete portion of the spectrum will be allowed to pass through the AOTF and will be visible.

The acceptance band of solid state tunable AOTFs can be electronically varied at rapid rates by tuning the frequency of the RF drive signal across a given range of frequencies. If some portion of the light in the incident beam is within the acceptance band of wavelengths it is shifted from the first polarization state to the second polarization state, and those objects in the scene that contain wavelengths within this band are diffracted while all other objects are not. As such, the objects that contain wavelengths within this band exhibit a flashing sensation, while the others remain constant. Thus, the AOTF can be used to scan a scene across a series of wavelengths and thereby identify and differentiate objects of specific spectral signatures from other objects and background clutter having different spectral signatures. The responsiveness provided by the solid-state operation of existing AOTFs enables this discrimination process to be performed at rapid rates approaching and exceeding real-time video rates.

This ability to distinguish the various objects in the field of view from each other lends itself to use in applications where objects may be visible but difficult to detect with the naked eye because they are indistinguishable from the background against which they are placed. Such applications include target recognition and threat detection and acquisition systems, in which the target or threat may be camouflaged by the surrounding environment, and autonomous vehicles that must be capable of discriminating among objects that lie in their path and determining whether or not they need be avoided.

Objects of interest in these and other scenarios can be discriminated with enhanced sensitivity if filtering is performed not only for spectral composition, but also for polarization state of the objects in the scene. For example, depending on chemical composition or surface structure, certain objects in a scene preferentially reflect radiation at linearly polarized states at certain wavelengths while other objects in the scene may reflect (or in the infrared, may emit) radiation that is circularly or elliptically polarized at certain wavelengths. For example, man-made objects (i.e., vehicles, structures, weaponry, etc.) generally differ from natural objects (i.e., vegetation, soil, rocks, etc.) in that they preferentially reflect radiation with a given linear polarized state at different wavelengths than do natural objects. Thus, by tuning the acceptance wavelength of the AOTF to that portion of the spectrum typically occupied by man-made objects, it is possible to discriminate man-made objects from their background. Even where shape or color alone may not suffice to extract an object from its background, the data from the AOTF will supply an additional discriminant to use in distinguishing an object from its surrounding environment.

As mentioned above, while some objects may reflect or emit radiation that is linearly polarized at certain wavelengths, other objects in the scene may reflect or emit radiation that is circularly or elliptically polarized at certain wavelengths. Object discrimination can be enhanced by analyzing the polarization characteristics of radiation having wavelengths that exhibit complex circular or elliptical polarization states as well as linear polarization states. However, a circularly or elliptically polarized incident beam cannot be made subject to detection by intensity variation using an AOTF. One means of enabling an AOTF to subject circularly or elliptically polarized incident beams to intensity variation for visualization and object discrimination is to first pass the beam through a phase retarder. Phase retarders have the property that they convert elliptically (or circularly) polarized light to linearly polarized light and therefore permit the AOTF to subject the incident light to the intensity analysis described above.

A typical phase retarder will include a phase plate comprised of a birefringent crystal, such as calcite, with ordinary and extra-ordinary refractive indices $n_o$ and $n_e$. The crystal is accurately polished to a thickness L, so that when radiation at a specific wavelength $\lambda$ passes through the crystal, the ordinary and extra-ordinary radiation will experience a relative phase difference or modulation of $\pi/2$ radians. As presented, the phase modulation relationship Δφ governing this process is:

$$\Delta\phi = 2\pi L(n_e - n_o)/\lambda = \pi/2 \qquad (1)$$

As dictated by the fact that the thickness L and refractive indices $n_o$ and $n_e$ are fixed, a given retardation plate is suited for use only with incident radiation of a specific wavelength. Thus, each particular wavelength to be analyzed requires a retardation plate specifically constructed for that particular wavelength. It is axiomatic then, that a complete analysis of a typical scene containing incident light of numerous wavelengths would require an equally numerous set of retardation plates. In operation, each plate would have to be sequentially positioned in the spectral imaging system such that each wavelength encountered can be individually addressed. Such a system would prove too cumbersome and expensive to be viable. The rate at which data could be gathered would be severely limited and unacceptably slow for the aforementioned applications.

A need thus exists for robust apparatus and methods providing for low-latency analysis of both spectral and complex polarization signatures, at high rates of recognition, in the presence of complex and varying background polarization signatures.

SUMMARY OF THE INVENTION

In accordance with a preferred form of the present invention, herein described is a spectro-polarimetric imaging system, and a method of using the same, capable of performing low-latency image discrimination based on spatial, spectral, polarimetric and temporal inputs, through the accumulation of spectro-polarimetric imaging data at high rates and over a wide spectral band, regardless of the polarization state of the incident radiation. The invention includes several preferred configurations, in which each configuration is particularly suitable for use with radiation having wavelengths falling in a particular portion of the spectrum.

The system provides the unique and novel combination of an electrically tunable phase retarder and an acousto-optic tunable spectral filter (AOTF). As such, the present spectro-polarimetric imaging system is capable of rapidly performing the functions of an AOTF teamed with a full set of fixed phase retardation plates, with far more efficiency and with far less complexity than previously realized. The present novel combination allows the present invention to perform complete spectral and complex polarization analysis of entire scenes comprising multiple wavelengths and polarization states at rates at or exceeding video rates. The preferred combination additionally includes acceptance optics and output optics.

The present invention is thus capable of subjecting light radiation, having both linear and complex polarization states, to low-latency spectral and complex polarization analysis of intensity variation and providing for visualization analysis of the resultant data at rates at or exceeding video rates. The ability to utilize spectro polarimetric signatures regardless of polarization state makes the present invention suitable for use in a host of applications in which existing object discrimination technology has proven ineffective. Examples of situations in which existing shape discrimination technology is inadequate include combat target identification, detection and analysis of the chemical make-up of unknown solids, liquids and gasses, agricultural monitoring, machine vision, medical imaging, and manufacturing process control systems. For each of these applications, the high speed electronically tunable apparatus and method described herein will allow operation at the high data rates required of real time systems.

Accordingly, the present invention provides solutions to the aforementioned problems associated with existing imaging technology. Those of ordinary skill in the art will appreciate that these and other details, objects and advantages will become apparent as the following detailed description of the present preferred embodiments thereof proceeds.

BRIEF DESCRIPTION OF THE DRAWINGS

In the accompanying drawings, preferred embodiments of the present invention are shown, wherein like reference numerals are employed to designate like parts and wherein.

DETAILED DESCRIPTION OF THE INVENTION

Figure 1:
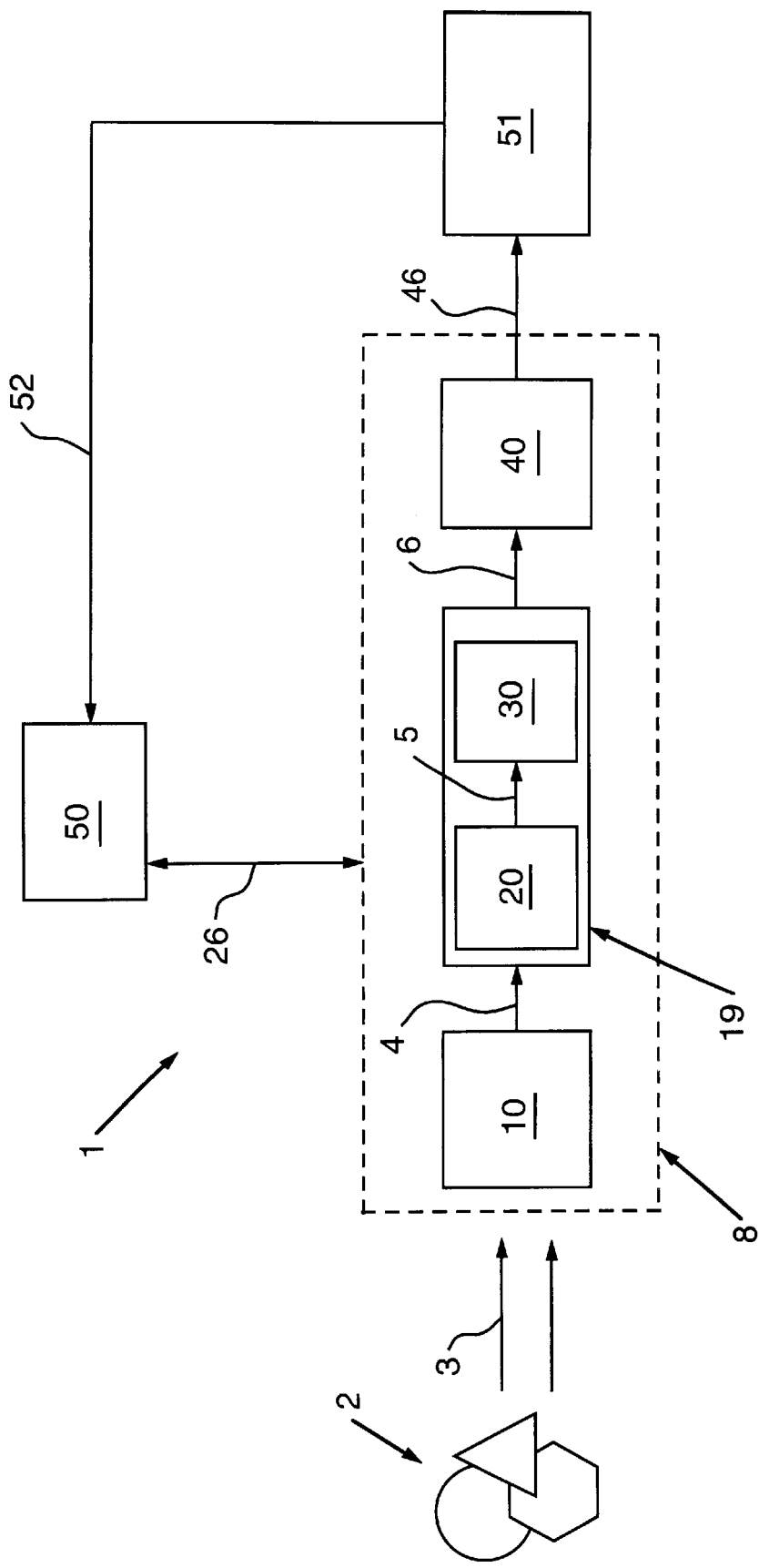
FIG. 1 is a functional diagram of the preferred embodiment of the present invention.

Referring now to the drawings for the purposes of illustrating preferred embodiments of the invention only, and not for purposes of limiting the same, the Figures show a spectro-polarimetric imaging system for performing both spectral analysis and complex polarization analysis. More particularly and with reference to FIG. 1, a spectra-polarimetric imager is shown generally at 1.

In accordance with the present invention and as shown in FIG. 1, acceptance optics 10 are provided to receive incident radiation 3 reflected or emanating from a target scene 2. Radiation 4 from the acceptance optics 10 is directed to pass through spectro-polarimetric signature elements 19. The spectro-polarimetric signature elements 19 include a tunable phase retarder 20 and an acousto-optic tunable spectral filter (AOTF) 30. Within the spectro-polarimetric signature elements 19, radiation 4 is initially passed through and processed by the tunable phase retarder 20. Radiation 5, having been acted upon by the tunable phase retarder 20, is then passed through and acted upon by the AOTF 30. Radiation 6 leaving the AOTF 30 enters output optics 40 and is transferred via connection line 46 to video display electronics 51. The performance of the acceptance optics 10, spectro-polarimetric signature elements 19, including the tunable phase retarder 20 and AOTF 30, output optics 40 and video display electronics 51 is monitored and controlled through control electronics 50. The control electronics 50 monitor and control the components of the spectro polarimetric imager by means of a system of control lines 26 and connection line 52.

Figure 2:
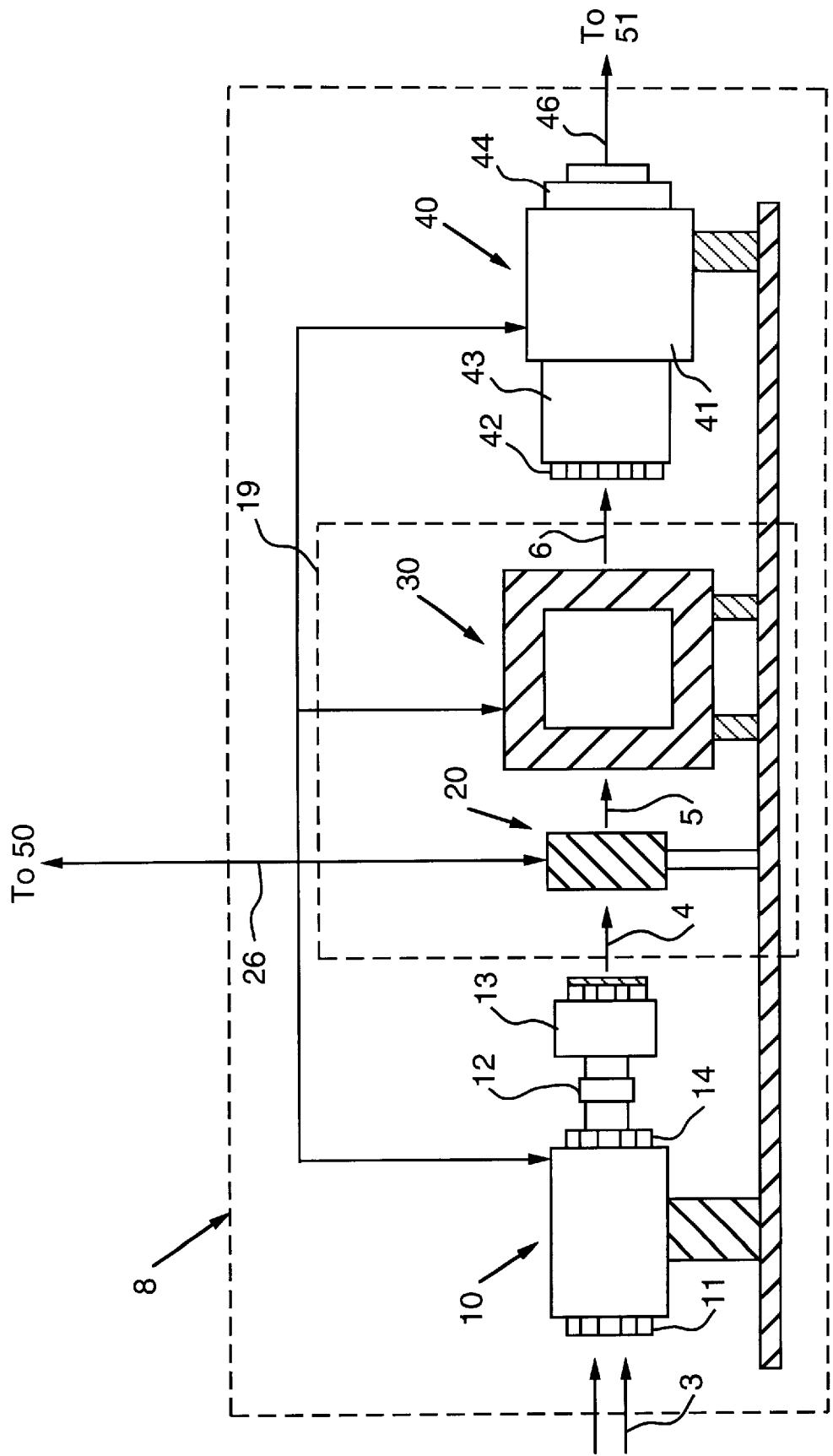
FIG. 2 is a schematic diagram depicting the apparatus designated by reference numeral 8 in FIG. 1.

FIG. 2 depicts the elements of the present invention contained within the box identified by reference numeral 8 in FIG. 1. Incident radiation 3 reflected or emanating from the target scene 2 enters an input zoom lens 11 of the acceptance optics 10 from the left-hand side of FIG. 2. The acceptance optics 10 preferably comprise, for example, the zoom lens 11 provided with an image defining aperture 12 and a collimating lens 13 for relaying the desired view of the target scene 2. The radiation 4 is directed into the tunable phase retarder 20 by the collimating lens 13. Regardless of the polarization state of the radiation 4 entering the tunable phase retarded 20, the tunable phase retarder 20 acts to modulate the radiation such that the radiation 5 leaving the tunable phase retarder 20 has a linearly polarized state. Radiation 5 leaving the tunable phase retarder 20 is directed to pass through the AOTF 30. Within the AOTF 30, the radiation 5 is sorted spectrally. Output radiation 6 leaving the AOTF 30 enters output optics 40. The output optics 40 preferably comprise a camera 41 and zoom lens 43 that serve to focus the spectrally filtered and polarized radiation onto detector array 44. The signal from the detector array 44 is electronically connected via connection line 46 to video display electronics 51 for visual and performance monitoring of the output radiation 6. Additional control lines, cumulatively designated as 26, are provided between the control electronics 50 and the component parts of the spectro-polarimetric imager described above.

Figure 3:
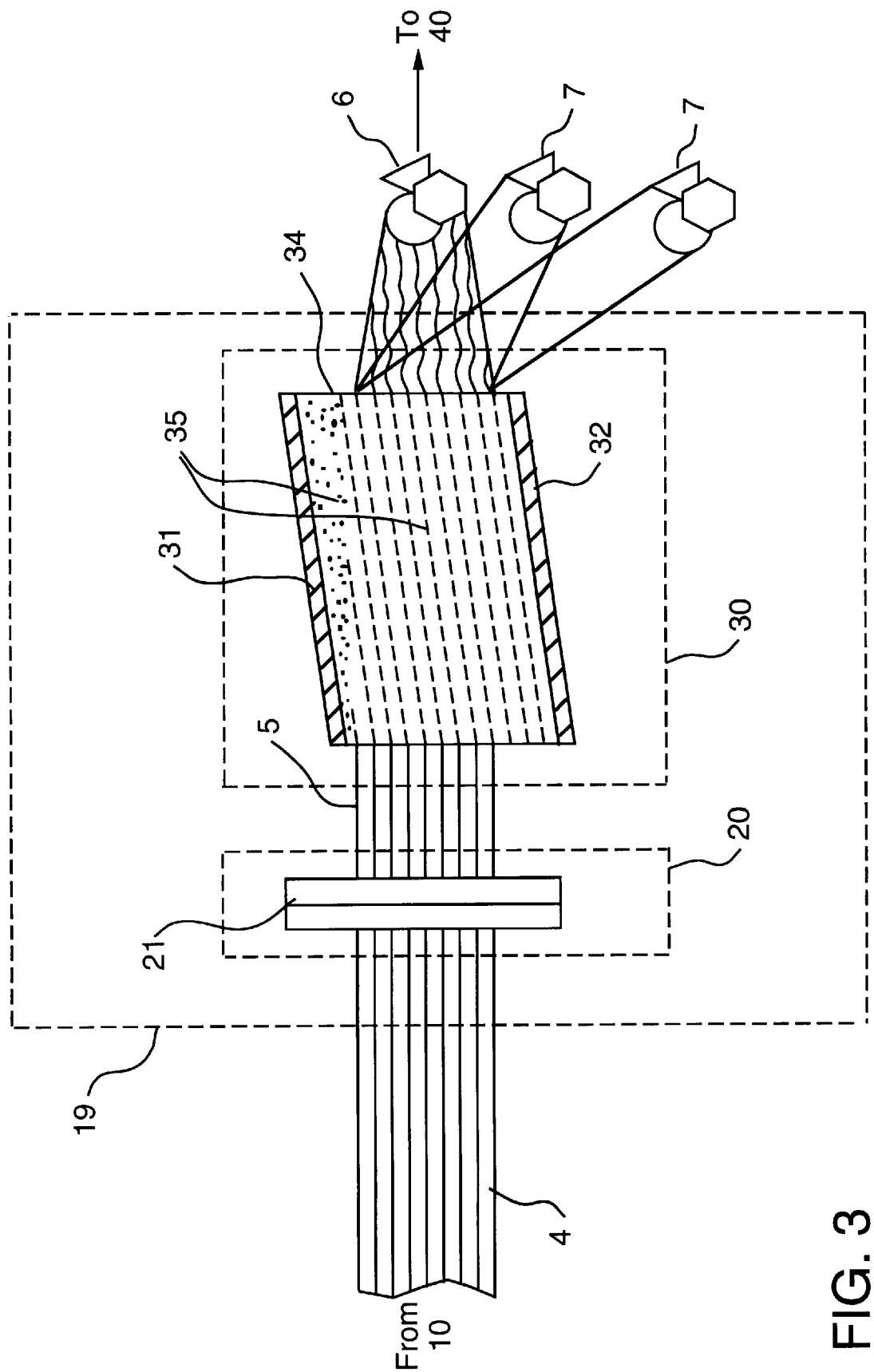
FIG. 3 is a schematic diagram depicting the apparatus designated by reference numeral 19 in FIGS. 1 and 2.

FIG. 3 depicts the spectro-polarimetric signature elements designated by 19, in FIGS. 1 and 2, which principally include the tunable phase retarder 20 and the AOTF 30. As shown in FIG. 3, radiation 4 from the acceptance optics 10 enters a passes through phase plate 21 of the tunable phase retarder 20. Depending upon the wavelength of the radiation 4 entering the tunable phase retarder 20, the plane of polarization of the radiation is rotated to eliminate the complex polarization characteristics of the radiation 4. Within the AOTF 30, the radiation 5 is passed through a birefringent crystal 34. The birefringent crystal 34 is outfitted with a transducer 32 and an accompanying absorption plate 31. The RF signal 35 is first generated by an electrical signal generator (not pictured) and then applied to the crystal 34 by the transducer 32 to tune the crystal 34 to select and filter radiation of a given wavelength and polarization direction. Upon passing through the AOTF 30, the output radiation 6 of the desired wavelength and polarization direction is separated from radiation 7 of other wavelengths and polarization direction. The output radiation 6 is then routed to the output optics 40 for display and analysis as described herein.

Referring once again to FIGS. 1 and 2, acceptance optics 10 are provided to frame the desired scene 2 and to direct the incident radiation 3 from the scene 2 into the tunable phase retarder 20. In the preferred embodiment, the acceptance optics 10 comprise a zoom lens 14, in combination with an image defining aperture 12 and a collimating lens 13. In the embodiment pictured in FIG. 1, the input lens 11 is preferably of the ½ inch variety manufactured by Computar, having an 8–80 mm motorized zoom and sold under the model number H10Z0812M. In the embodiment pictured in FIG. 1, the collimating lens 13 is of the type manufactured by Computar, having a 50 mm fixed focal length and sold under the model number V5013.

The important design parameters of the acceptance optics 10 are the front focal length $f_1$ and the back focal length $f_2$. These parameters will determine the slit width $S_1$, the effective lens aperture $A_1$, the external field-of-view $\theta_{FOV}$ and the magnification m=(crystal FOV)/$\theta_{FOV}$ of the acceptance optics 10. It is generally desired that the defining aperture 12 be selected so that it is narrow enough to insure separation of filtered and unfiltered images on the camera's image window. Preferably, the aperture angular width is 2.2°. It is preferred that the focal length of the lens 11 of optics 10 be selected to match the angular spread of the filtered ray entering the lens 11 (limited by the aperture width) with the size of the imaging ray. Preferably, the input lens 11 is equipped to allow easy adjustment of the focal length. However, once the adjustment is made the input lens 11 held to a generally fixed position.

Figure 4:
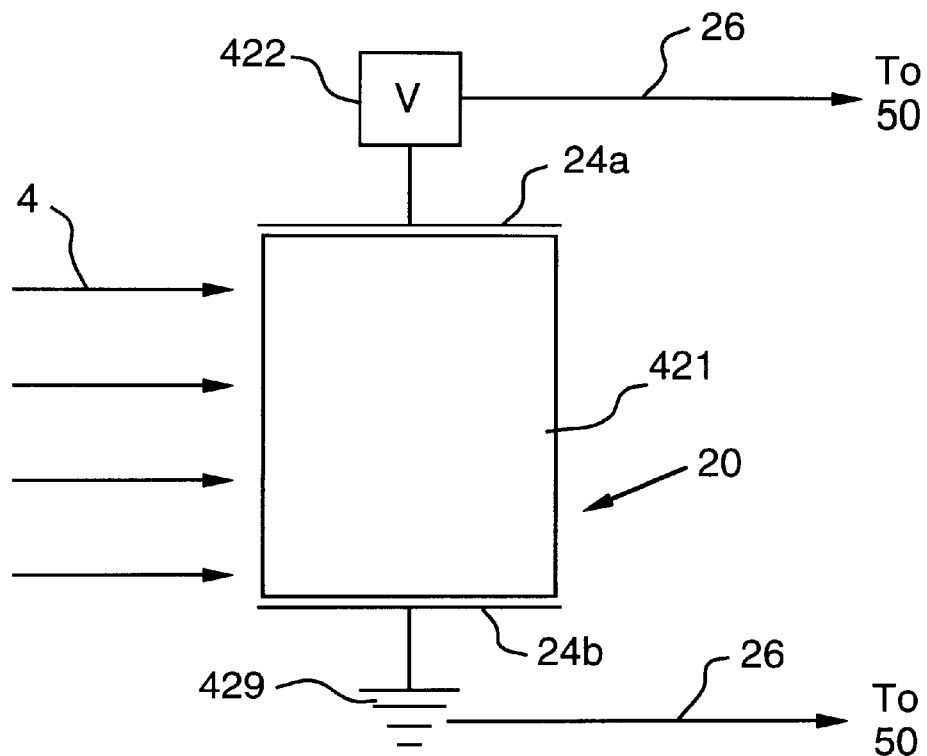
FIG. 4 is a schematic diagram of an embodiment of a tunable phase retarder of the present invention, preferred for use with light in the visible and near infrared ranges.

The preferred implementation of the tunable phase retarder 20 will depend upon the wavelength range of the radiation 4: UV, visible, near infrared or far infrared. In each case, the preferred means of implementing the tunable phase retarder 20 includes such physical effects as electro-optic modulation and photo-elastic modulation. In the visible and near infrared range, see FIG. 4, the preferred implementation of the tunable phase retarder 20 includes a electronically tunable liquid crystal plate 421. The refractive index and birefringence of liquid crystal plate 421 are tuned by means of a drive signal applied by electrodes 24a and 24b. The electrodes 24a and 24b are connected across a voltage source 422 and a reference potential 429 (ground). The drive signal is regulated by control electronics 50 via control line 26. Such a liquid crystal electronically tunable plate 421 and the accompanying control line 26 are manufactured by Meadowlark Optics of Longmont, Colo.

Figure 5:
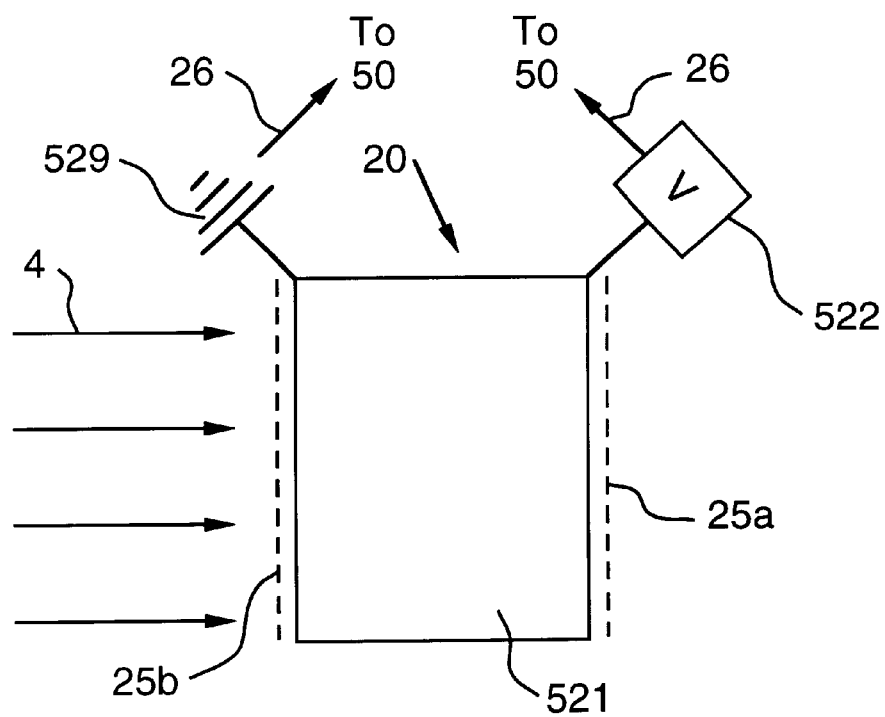
FIG. 5 is a schematic diagram of an embodiment of a tunable phase retarder of the present invention, preferred for use with light in the ultra-violet and visible ranges.

In the UV and visible ranges, see FIG. 5, the preferred implementation of the tunable phase retarder 20 includes an electro-optically varied crystal plate 521. The electro-optically varied crystal plate 521 is ideally composed of a crystal such as potassium di-hydrogen phosphate (KDP) or lithium niobate ($LiNbO_3$). In this embodiment of the tunable phase retarder 20, the electrical field applied by transparent electrodes 25a and 25b is used to vary the refractive index and birefringence of the electro-optically varied crystal plate 521. The electrodes 25a and 25b are connected across a voltage source 522 and a reference potential 529 (ground). The voltage source 522 is regulated by control electronics 50 via control line 26.

Figure 6:
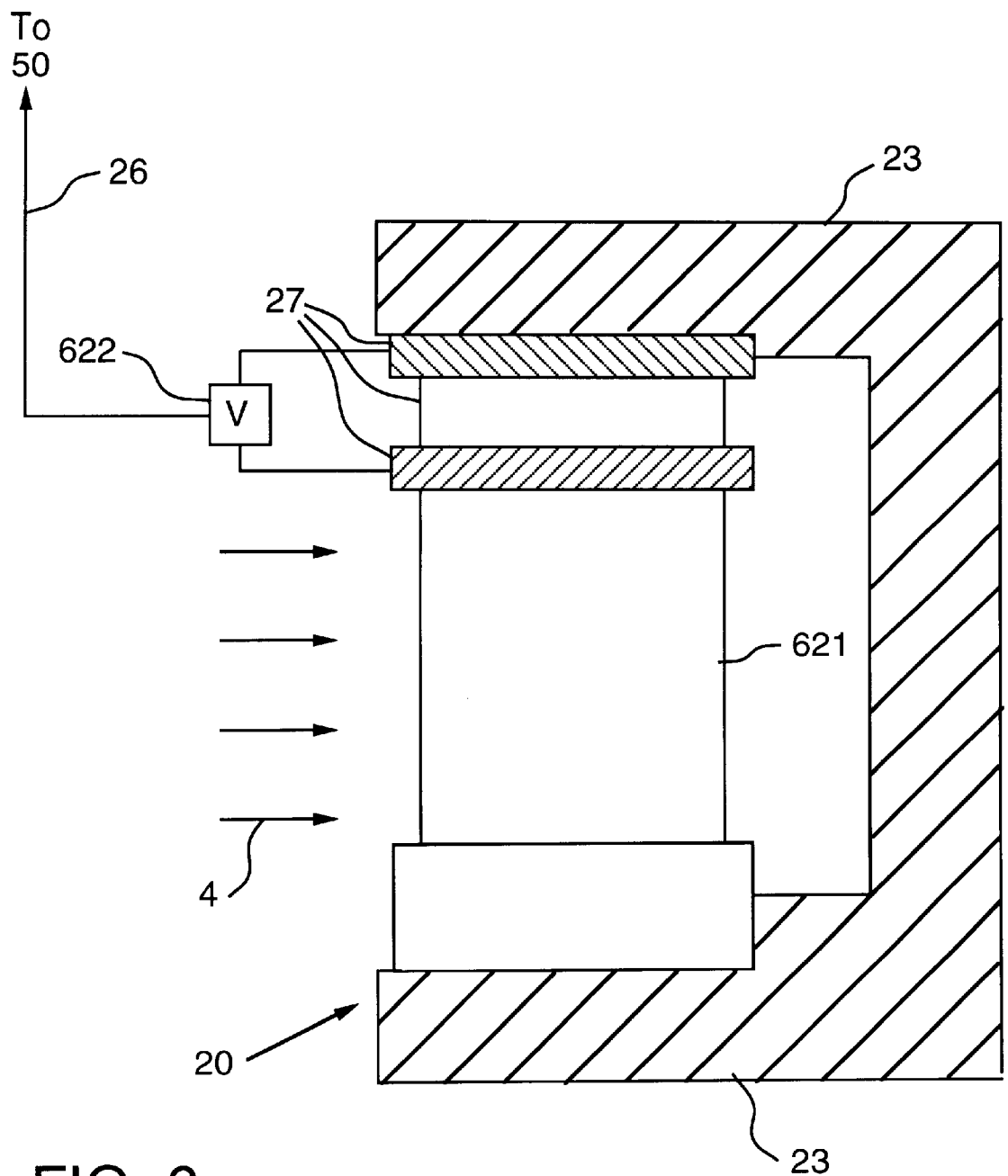
FIG. 6 is a schematic diagram of an embodiment of a tunable phase retarder of the present invention, preferred for use with light in the mid to far infrared ranges.

In the mid-infrared and far infrared ranges, see FIG. 6, the preferred implementation of the tunable phase retarder 20 includes a photo-elastic modulator crystal plate 621 held in a rigid mount 23. Favorable materials for the photo-elastic modulator crystal plate 621 include germanium, silicon and zinc selenide. The refractive index and birefringence of the photo-elastic modulator crystal plate 621 are determined by the amount of uni-axial pressure applied to the crystal plate 621 by a piezo-electric stack 27 and its direction relative to the crystal plate 621. The compression exerted by the stack 27 will govern the birefringence and modulation wavelength of the crystal plate 621. The amount of pressure exerted by the stack 28 on the crystal plate 621 is varied electronically by applying a voltage from a voltage source 622 to the stack 28. The voltage source 622 is controlled by control electronics 50 via control line 26.

In each of the embodiments of the tunable phase retarder 20 described above and depicted in FIGS. 4–6, the ordinary and extra-ordinary indices of refraction $n_e$ and $n_o$ of each of the crystal plates 421, 521 and 621, respectively, can be made to vary in response to an electrical signal. With reference to equation (1), which is reproduced below:

$$\Delta\phi = 2\pi L(n_e - n_o)/\lambda = \pi/2 \quad (1)$$

the quarter wave relationship ($\pi/2$) for a fixed plate thickness L can be arrived at for radiation 4 having a varying wavelength $\lambda$ by applying an electrical field to the tunable phase retarder 20 and tuning the plates 421, 521 and 621, respectively, such that the birefringence ($n_e - n_o$) is made to vary in proportion to the variations in wavelength of the radiation 4 and thus satisfy equation (1) for the wavelengths of radiation 4. To locate the quarter wave phase position, the plate 421, 521 and 621, respectively, must have sufficient tunability to span plus and minus one quarter wave (or a range of one-half wave) from the wavelength of the radiation 4. Typically, with each of the preferred embodiments, electrically inducing a variation in the refractive indices $n_e$ and $n_o$ exhibits response times of a millisecond time scale or less. Thus, unlike non-tunable phase retarders which have fixed indices of refraction $n_e$ and $n_o$, this agility makes the spectro-polarimetric imaging concept feasible for most applications requiring high data input rates at or above video rates.

Preferably, the present invention will use any of the tunable phase retarders 20 described above and represented schematically in FIGS. 4–6. However, in alternative embodiments (not pictured), the present invention may be adapted for use with any other type of electronically tunable phase retarder known in the art. Additionally, physical mechanisms for controlling the refractive index of a tunable phase retarder 20 that are known to work in the present invention include apparatus designed to operate under the magneto-optic effect and photo-refractive effect. Additional physical embodiments for constructing a tunable phase retarder 20 include stretched polymer layers and holographic elements (not pictured). However, in all cases, it is desirable that the tunable phase retarder 20 be capable of being tuned at rates that equal or surpass those of video rates to allow for real-time processing of image data.

Figure 7:
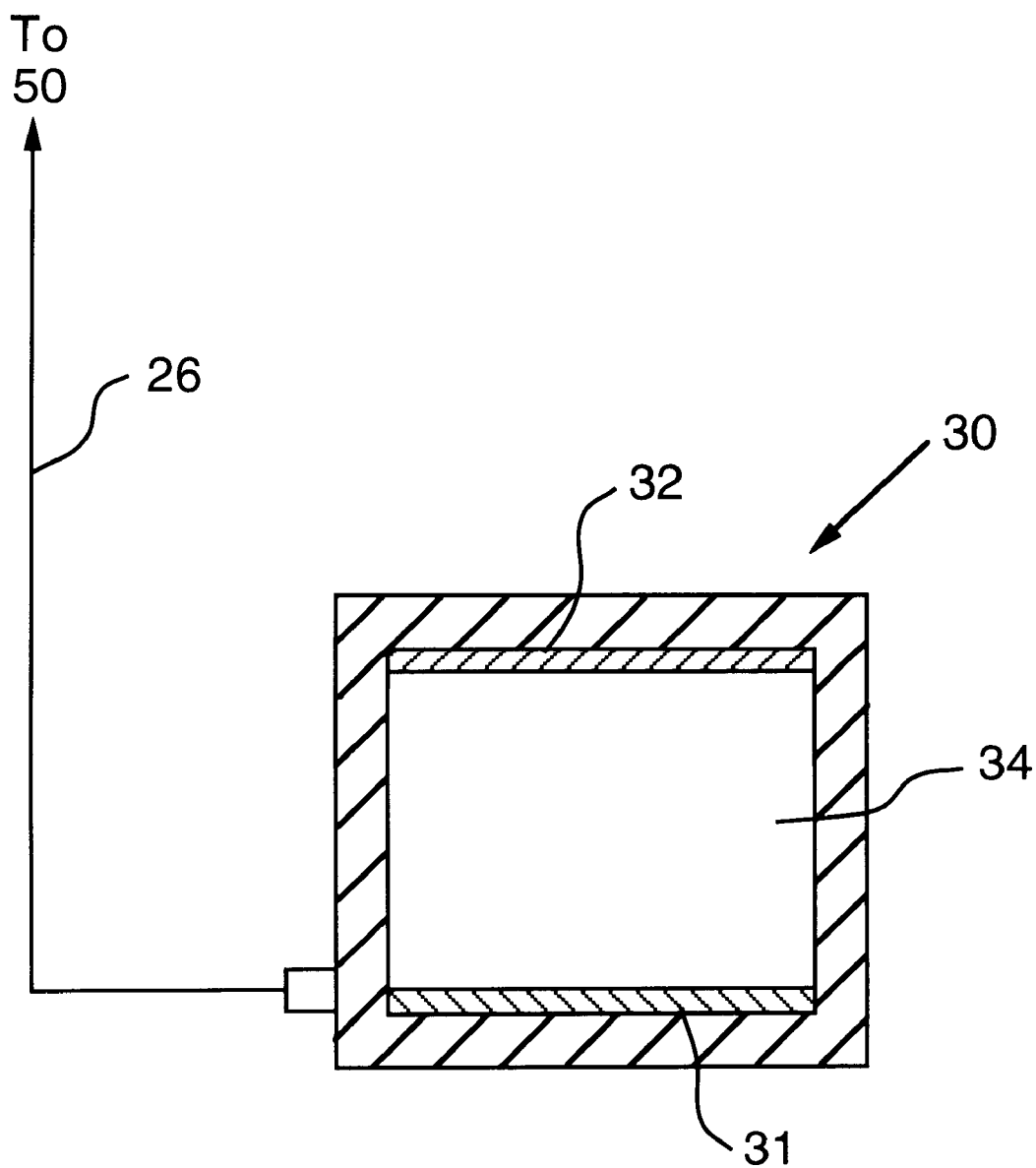
FIG. 7 is a schematic diagram of the preferred embodiment of the acousto-optic tunable spectral filter (AOTF)

The AOTF 30, shown in its preferred embodiment in FIG. 7, utilizes the action of a tellurium dioxide ($TeO_2$) birefringent crystal 34 in response to an RF drive signal from an acoustic excitation transducer 31 to tune the filter to accept and allow to pass through radiation 5 of a particular wavelength and polarization direction. The transducer 31 which is connected to the control electronics 50, to provide for regulation of the drive signal through the crystal 34. The absorption plate 32 suppresses acoustic energy reflections from the crystal surface. Such an AOTF 30 is of the type manufactured by NEOS, Inc. of Melbourne, Fla. The useful spectral range of the AOTF 30 is controlled by the spectral transmission of the crystal 34 and coupling parameters of the transducer 31. As shown in FIG. 3, the AOTF 30 accepts an incident beam of radiation 5 and separates a selected spectral band or bands from the radiation having the desired wavelength and polarization direction. Unless the radiation 5 entering the AOTF 30 is already polarized, the filtered scene is then spatially separated into orthogonally polarized component beams of light (6 and 7 respectively) and separated by a separation distance. As such, only radiation 6 having the desired wavelength and polarization direction is passed through the AOTF 30 to the output optics 40. The AOTF 30 can be tuned at very high response rates to match radiation 5 having a complex spectral signature by applying a multiple-frequency drive signal to the crystal 34 from the transducer 31.

Turning once again to FIGS. 1 and 2, output optics 40 are provided to allow for visualization and analysis of the results of the image discrimination process. In the preferred embodiment, output optics 40 comprise a camera 41 and connection line 46 linking the output optics 40 to video display electronics 51 and to the control electronics 50. The camera 41 includes an input lens 42 and detector array 44 and is preferably of the type manufactured by Computar, having a 1 inch manual 60–300 mm zoom lens 43 and sold under the model number L5Z6004.

Figure 8:
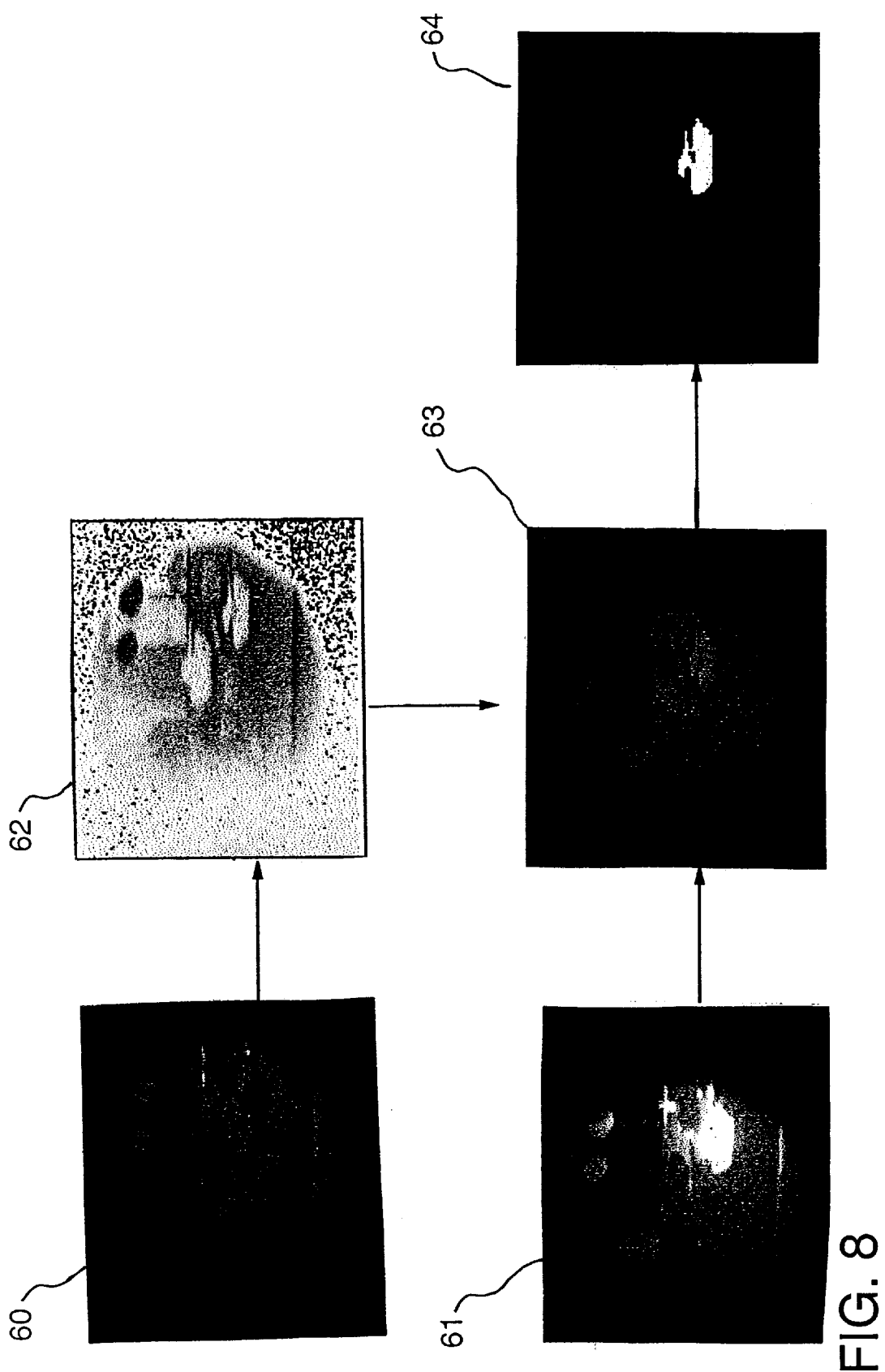
FIG. 8 is a block diagram depicting a preferred method of utilizing data collected from the invention to distinguish objects from their background.
Figure 9:
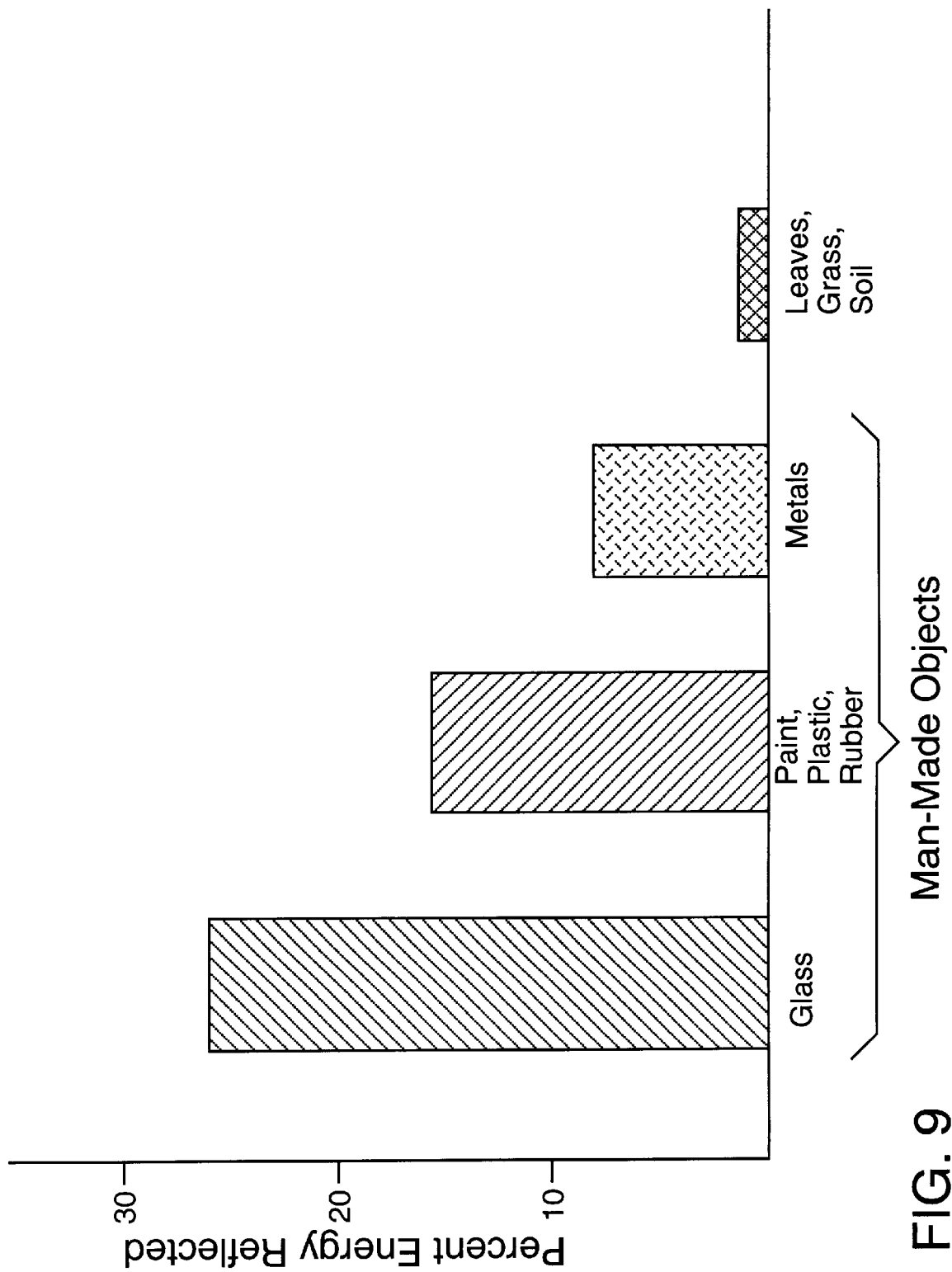
FIG. 9 is a chart, graphically illustrating the differences in intensities of energy reflected between first and second polarizing angles from various objects in sunlight.

The preferred method of operation of the apparatus described herein to distinguish objects of known polarization and spectral signature from other objects in a visually similar background, employs a background suppression algorithm depicted in block-diagram format in FIG. 8. A target signature of the target object or objects 2 desired to be distinguished from their background is first selected. As shown graphically in FIG. 9, man-made objects reflect or omit radiation differently than non-man-made or natural objects. Therefore, when the target 2 is a man-made object, it is possible to use known data, such as that displayed in FIG. 9, to estimate and select a target signature in the range typically occupied by man-made objects. Two frames of the subject environment containing the target objects 2 are taken. A "non-signature frame" 60, is taken over a range of wavelengths or polarization states known to be different from the known wavelength of the target 2. A "signature frame" 61 is taken over a range of wavelengths or polarization states that are known to be similar to the wavelength of the target 2. The visual image of the non-signature frame 60 is inverted to create a mask frame 62. The mask frame 62 serves to block the spectral regions which differ from that of the spectral region of the target 2. The mask 62 and the signature frame 61 are multiplied or super-imposed to form a super-imposition frame 63. The result of the superimposition process is then improved by a threshold process to produce frame 64 in which only those objects with the signature of the target 2 are displayed and those objects without this signature are suppressed from view. The threshold image 64 thus shows a scene containing the target 2 with virtually all background from the original frame "masked" or suppressed. When the background masking algorithm is used in conjunction with either polarized images or spectral images alone, similar masking properties result.

Analysis of any variations in intensity and spatial relationship between target images present within a sequence of threshold images 64 taken over a length of time can be used to provide yet another discriminant upon which to distinguish the target object 2 from its background. When the control electronics 50 are implemented using commercially available computer hardware, the apparatus and method described herein are capable of performing low-latency image discrimination, based on spatial, spectral, polarimetric and temporal inputs, at rates equal to or above those of standard video display rates (30 frames per second). Thus, image analysis of the variations present within a sequence of threshold images 64 can be performed at real-time rates.

In accordance with a preferred form of the present invention, herein described is a spectro-polarimetric imaging system and a method of using the same, capable of performing low-latency image discrimination based on spatial, spectral, polarimetric and temporal inputs, through the accumulation of spectro-polarimetric imaging data at high rates and over a wide spectral band, regardless of the polarization state of the incident radiation. Those of ordinary skill in the art will, of course, appreciate that various changes in the details, materials and arrangements of parts which have been herein described and illustrated in order to explain the nature of the invention may be made by those skilled in the art within the principle and scope of the invention as expressed in the appended claims.

What is claimed is:

1. A system, comprising:

an electronically tunable optical phase retarder for receiving an incident beam of radiation and converting radiation within the beam having a complex polarization state into a radiation having linear polarized state;

an acousto-optic tunable spectral filter for selectively passing polarized radiation having a desired frequency; and control electronics for tuning said phase retarder and said spectral filter.

2. The system of claim 1, further comprising:

acceptance optics for receiving the incident beam of radiation and directing it to said phase retarder; and output optics positioned to accept and output radiation passed from said tunable spectral filter;

wherein said control electronics control a performance characteristic of at least one of said acceptance optics and said output optics.

3. The system of claim 2, wherein said acceptance optics further comprise, in series, an input lens, an image defining aperture and a collimating lens.

4. The system of claim 1, wherein said phase retarder is comprised of an electronically tunable liquid crystal.

5. The system of claim 1, wherein said phase retarder is comprised of an electro-optic varied crystal.

6. The system of claim 5, wherein said electro-optic varied crystal is one of KDP and lithium niobate.

7. The system of claim 1, wherein said phase retarder is comprised of a photo-elastic modulator crystal.

8. The system of claim 7, wherein said photo-elastic modulator crystal is comprised of one of germanium, silicon and zinc-selenide.

9. An system, comprising:

acceptance optics;

an electronically tunable phase retarder for receiving incident radiation from said acceptance optics;

an acousto-optic tunable spectral filter for receiving radiation from said phase retarder;

output optics for accepting radiation from said acousto-optic tunable filter; and control electronics for controlling a performance characteristic of said acceptance optics, phase retarder, spectral filter and output optics.

10. The system of claim 9, wherein the acceptance optics further comprise, in series, an input lens, an image defining aperture and a collimating lens.

11. The system of claim 9, wherein said phase retarder is comprised of an electronically tunable liquid crystal.

12. The system of claim 9, wherein said phase retarder is comprised of an electro-optic varied crystal.

13. The system of claim 12, wherein said electro-optic varied crystal is one of KDP and lithium niobate.

14. The system of claim 9, wherein said phase retarder is comprised of a photo-elastic modulator crystal.

15. The system of claim 14, wherein said photo-elastic modulator crystal is comprised of one of germanium, silicon and zinc-selenide.

16. A method of low-latency image discrimination comprising the steps of:

passing incident radiation through a phase retarder;

tuning the phase retarder to cause a phase shift in said radiation;

passing radiation from said phase retarder through an acousto-optic tunable spectral filter; and tuning said acousto-optic tunable spectral filter to accept and pass a given wavelength of said radiation.

17. A method of low-latency image discrimination comprising the steps of:

electronically converting complex polarized radiation to linearly polarized radiation; and electronically determining the intensity of said linearly polarized radiation.

18. The method of low-latency image discrimination of claim 17, wherein the steps of electronically converting complex polarized radiation to linearly polarized radiation electronically and determining the intensity of said linearly polarized radiation are completed at rates at or exceeding those of video rates.

* * * * *